(12) United States Patent
Manolis et al.

(10) Patent No.: US 7,146,575 B2
(45) Date of Patent: *Dec. 5, 2006

(54) IMAGE UPLOADING

(75) Inventors: Eva Manolis, Menlo Park, CA (US);
Chase Garfinkle, Redwood City, CA
(US); Patrick Teo, San Mateo, CA
(US); Hwei Mien Quek, Cupertino, CA
(US); Roderick Mann, Belmont, CA
(US)

(73) Assignee: Shutterfly, Inc., Redwood City, CA
(US)

( * ) Notice: Subject to any disclaimer, the term of this patent is extended or adjusted under 35 U.S.C. 154(b) by 702 days.

This patent is subject to a terminal disclaimer.

(21) Appl. No.: 10/374,898

(22) Filed: Feb. 25, 2003

(65) Prior Publication Data

US 2004/0008226 A1 Jan. 15, 2004

Related U.S. Application Data

(63) Continuation of application No. 09/450,804, filed on Nov. 29, 1999, now Pat. No. 6,583,799.

(60) Provisional application No. 60/167,243, filed on Nov. 24, 1999.

(51) Int. Cl.
*G06F 17/30* (2006.01)
*G06F 15/00* (2006.01)
(52) U.S. Cl. ..................................... 715/838; 715/859
(58) Field of Classification Search ................ 715/736, 715/748, 769, 805, 851, 854, 838, 859, 763, 715/765, 744, 835, 839
See application file for complete search history.

(56) References Cited

U.S. PATENT DOCUMENTS 6,374,260 B1 *  4/2002  Hoffert et al. ........... 707/104.1
6,453,078 B1 *  9/2002  Bubie et al. ................ 382/305
2006/0008175 A1 *  1/2006  Tanaka et al. .............. 382/276

* cited by examiner

*Primary Examiner*—Cao (Kevin) Nguyen
(74) *Attorney, Agent, or Firm*—Xin Wen

(57) ABSTRACT

A computer-implemented method uploads image data to a remote computer such as a server by: defining an area in a user interface adapted to receive an image; generating a thumbnail associated with the image when the image is associated with the area; and, uploading the image to the server.

20 Claims, 13 Drawing Sheets

IMAGE UPLOADING

PRIORITY CLAIM

This application is continuation of U.S. application Ser. No. 09/450,804, now U.S. Pat. No. 6,583,799, which claims priority from U.S. provisional patent application Ser. No. 60/167,243, entitled "Digital Photo Printing Service", filed Nov. 24, 1999.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights.

TECHNICAL FIELD

This application relates to processing and uploading of image files.

BACKGROUND

A computer system 100 illustrated in FIG. 1 represents a typical hardware setup for executing software that allows a user to perform tasks such as communicating with other computer users, accessing various computer resources, and viewing, creating, or otherwise manipulating electronic content—that is, any combination of text, images, movies, music or other sounds, animations, 3D virtual worlds, and links to other objects. The system includes various input/output (I/O) devices (mouse 103, keyboard 105, display 107) and a general purpose computer 100 having a central processor unit (CPU) 121, an I/O unit 117 and a memory 109 that stores data and various programs such as an operating system 111, and one or more application programs 113. The computer system 100 also typically includes non-volatile memory 110 (e.g., flash RAM, a hard disk drive, and/or a floppy disk or other removable storage media) and a communications card or device 123 (e.g., a modem or network adapter) for exchanging data with a network 127 via a communications link 125 (e.g., a telephone line).

The computer 100 of FIG. 1 also can be connected to various peripheral I/O devices. One of the more popular of such peripheral devices is a digital camera 108 that enables users to take pictures and save them in digital (electronic) format. The digital camera 108 enables users to take pictures (i.e., images), which are saved in memory (not shown) within the digital camera 108 in a digital (electronic) format. After taking and storing the images, the user can connect the digital camera 108 to a computer system 100 in order to upload the digital images to the computer's disk drive or other non-volatile memory 110. Once the digital images are uploaded to the computer system 100, the user can erase the digital images from the memory of the digital camera 108 so that the user can take and store additional images using the digital camera 108. Typically, the digital camera 108 is connected to the computer 100 only while the user is uploading images to the computer's disk drive or other non-volatile memory 110.

Users also can obtain digital images, for example, of film-based prints from a traditional camera, by sending an exposed film into a photo-finishing service, which develops the film to make prints and then scans (or otherwise digitizes) the prints or negatives to generate digital image files. The digital image files then can be transmitted back to the user by e-mail or on a CD-ROM, diskette, or other removable storage medium.

In any event, once the digital images are stored on the computer 100, a user can perform various operations on them. For example, an image viewer application can be used to view the images or a photo editor application can be used to touch-up or otherwise modify the images. In addition, an electronic messaging (e.g., e-mail) application can be used to transmit the digital images to other users.

In addition to viewing the digital images on the computer display 107, users often desire to have hard copies (physical prints) made of digital images. Such hard copies can be generated locally by the user using output devices such an inkjet printer or a dye sublimation printer. In addition, users can transmit digital images (e.g., either over a computer network or by using a physical storage medium such as a floppy disk) to a photo-finishing service, which can make hard copies of the digital images and send them (e.g., by U.S. Mail or courier service) back to the user.

FIGS. 2A–2F show a sequence of screen shots that a user might encounter when transmitting digital images to a photo-finishing service to have hard copies (prints) made of the images. In FIG. 2A, the user first encounters a contact information window 200 in which the user must enter several items of contact information such as first and last names 202, 204, address 206, city 208, state 210, country 210, phone 214, fax 216, and Email address 218. This information typically is required by the photo-finishing service for each order for purposes of billing and shipping.

After the user has entered the required information, the user presses the Next button 220 to arrive at the next screen—an image selection window 222 as shown in FIGS. 2B and 2C. In the image selection window 222, the user designates the specific images of which hard copies are to be made. The digital images either can be selected from among the images stored on the user's computer by clicking the "Select Image . . . " button 230 or they can be acquired from a digital camera or scanner attached to the user's computer by clicking the "Acquire Image . . . " button 232. Once selected, the images can be viewed and/or cropped by clicking on the "View/Crop" button 234. In addition, the user can designate the hard copy format and other parameters (e.g., size, number of copies, paper type) for each of the selected images by selecting or entering the desired options using drop-down list 224 and text box 226. The selected images and their associated parameters are shown in display area 228. Typically, each order for prints must meet a minimum order amount 223 (e.g., five dollars).

After the images and their respective hard copy parameters have been selected, the user clicks the Next button 236 and a shipping and payment information window 238 is presented. In this window 238, the user selects a desired shipping method from drop-down list 240 and specifies a method of payment and associated verification information in text boxes 242, 244, 246 and 248.

After this information has been provided, the user clicks the Next button 250 and is presented with an order confirmation window as shown in FIG. 2E. The order verification window 250 allows the user to view and confirm the order including the images selected and their respective parameters in display area 252, as well as the price of the order 254. If the user is satisfied with the order, the user clicks the Finish button 256 to complete the order.

Upon completing the order, the images are uploaded to the photo-finishing service as indicated by the upload window 258 in FIG. 2F. Once the images are uploaded, the photo-finishing service arranges to have prints made of the selected images and to have the prints mailed to the user and address specified in the contact information window 200 shown in FIG. 2A. If the user desires to have prints of the same (or different) images sent to another person (e.g., a family member or friend), the user typically must repeat the entire order generating process represented by FIGS. 2A–2F. Generally, repeating the ordering process to send prints to another person involves entering a considerable amount of redundant information and incurring separate charges, including multiple minimum order charges, on the user's credit card (or other financial instrument) as well as potentially requiring the image to be uploaded multiple times.

The present inventors recognized that it would be advantageous to provide users with a intuitive and robust environment in which a user can review a thumbnail associated with the image and upload image files so that they can be printed and/or distributed to multiple recipients while minimizing the user's time, effort, and expense in uploading the image files.

SUMMARY

In one aspect, a computer-implemented method uploads image data to a remote computer such as a server by: defining an area in a user interface adapted to receive an image; generating a thumbnail associated with the image when the image is associated with the area; and, uploading the image to the server.

Implementations of the method includes generating the thumbnail by decompressing the image file. Further, the thumbnail can be saved in a local file. The thumbnail can be loaded into a browser for viewing. The thus generated thumbnail can be uploaded to the server. The image file can then be sent to the server. The image file can be partitioned into one or more fragments. Metadata associated with each fragment can be generated to be sent to the server. The fragment can be individually uploaded to the server. If the upload generates one or more errors, the user can be informed about the with one or more error messages and instructions.

In a second aspect, a computer-implemented method uploads image data from a local computer to a remote computer by: receiving input from a user identifying an image file; generating a thumbnail image from the image file; and displaying the generated thumbnail image as a component of a web page received from the remote computer.

In yet another aspect, a computer-implemented method uploads image data from a local computer to a remote computer by: receiving input from a user identifying an image file; generating a thumbnail image from the image file; and uploading the generated thumbnail image to the remote computer before uploading the image file to the remote computer.

In yet another aspect, a computer-implemented method facilitates orders for prints of images by: displaying a thumbnail image representing a complete image; receiving input from a user ordering a print of the complete image; and delaying the print order if an image file corresponding to the complete image has not yet been uploaded.

Implementation of this aspect includes fulfilling the print order when the image fie corresponding to the complete image has been uploaded.

Advantages may include one or more of the following. The systems and techniques described here provide intuitive visual abstractions and mechanisms for efficiently and quickly designating objects, such as digital images, to be uploaded to a server. The systems and techniques also allow these images to be shared and delivered to predetermined groups of one or more recipients. By representing distribution aliases as graphic symbols (e.g. icons) with which objects can be associated (e.g., by dragging digital objects and dropping them on a graphic symbol), the act of uploading image files is simplified dramatically. At the same time, the number of discrete steps or operations required of a user to upload image files is minimized. Moreover, by enabling physical representations of the digital objects to be distributed automatically to the designated recipients, either instead of or in addition to the corresponding digital objects, objects such as physical image prints can be distributed to multiple recipients with a minimum of time, expense and effort.

One or more of the following additional advantages may also be provided. The systems and techniques described herein provide the user with robust and detailed information relating to the uploading process. The system and techniques gracefully handle upload failures in that automatic recovery, if possible, is provides. If automatic recovery is not possible, the user is informed that an upload had failed so that the user can restart the upload process. The process can handle both system related errors as well as user related errors. For instance, the user may start the upload and forget that the upload process is running due to the time required to upload multi-megabyte image files and later either turn off the computer or quit the viewer. Rather than assuming that the upload process was successful, the feedback provided by the process informs the user that he or she needs to take corrective actions.

The details of one or more embodiments are set forth in the accompanying drawings and the description below. Other features, objects, and advantages of the invention will become apparent from the description and drawings, and from the claims.

DRAWING DESCRIPTIONS

DETAILED DESCRIPTION

Figure 1:
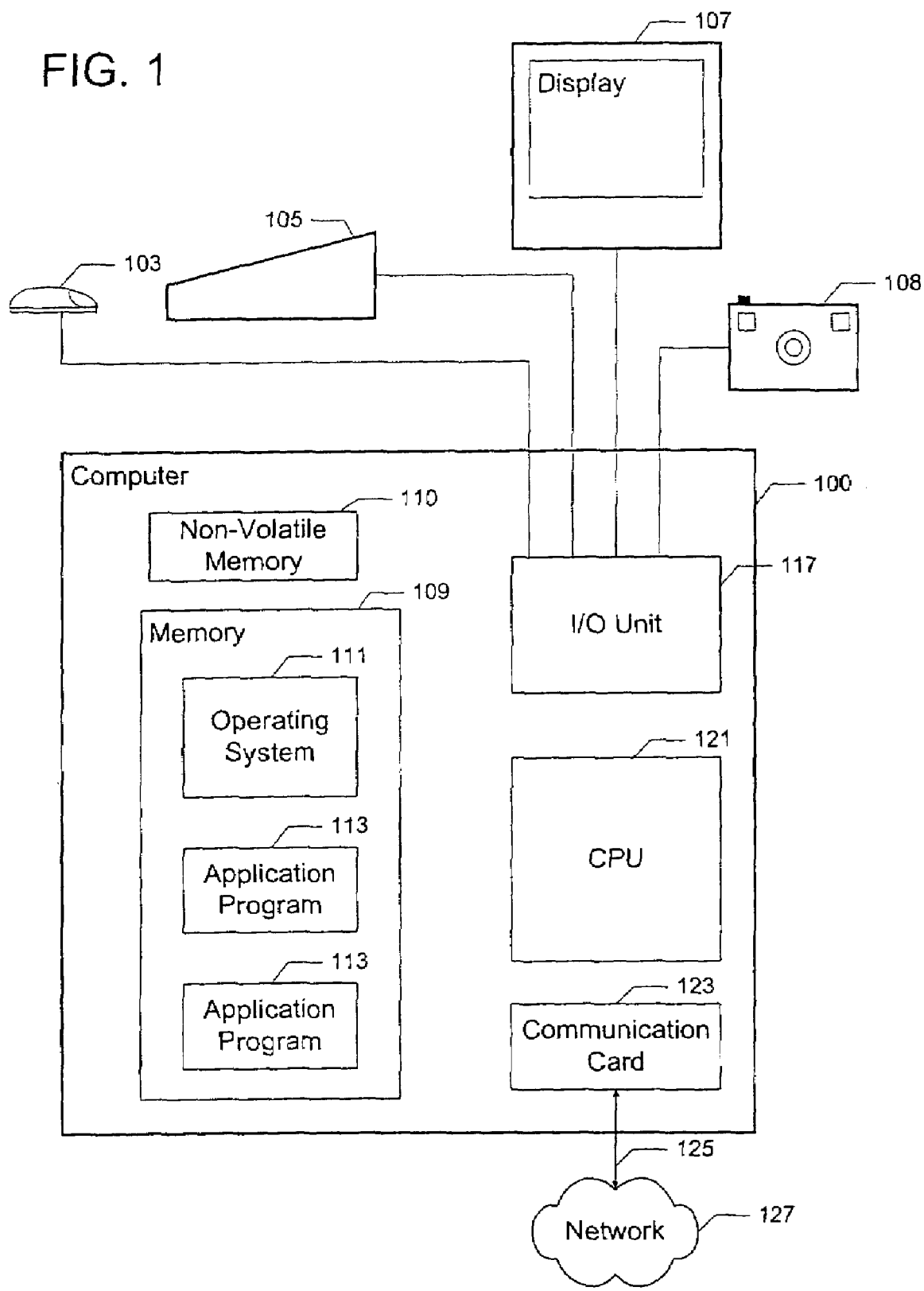
FIG. 1 is a block diagram showing a typical computer architecture.
Figure 2A:
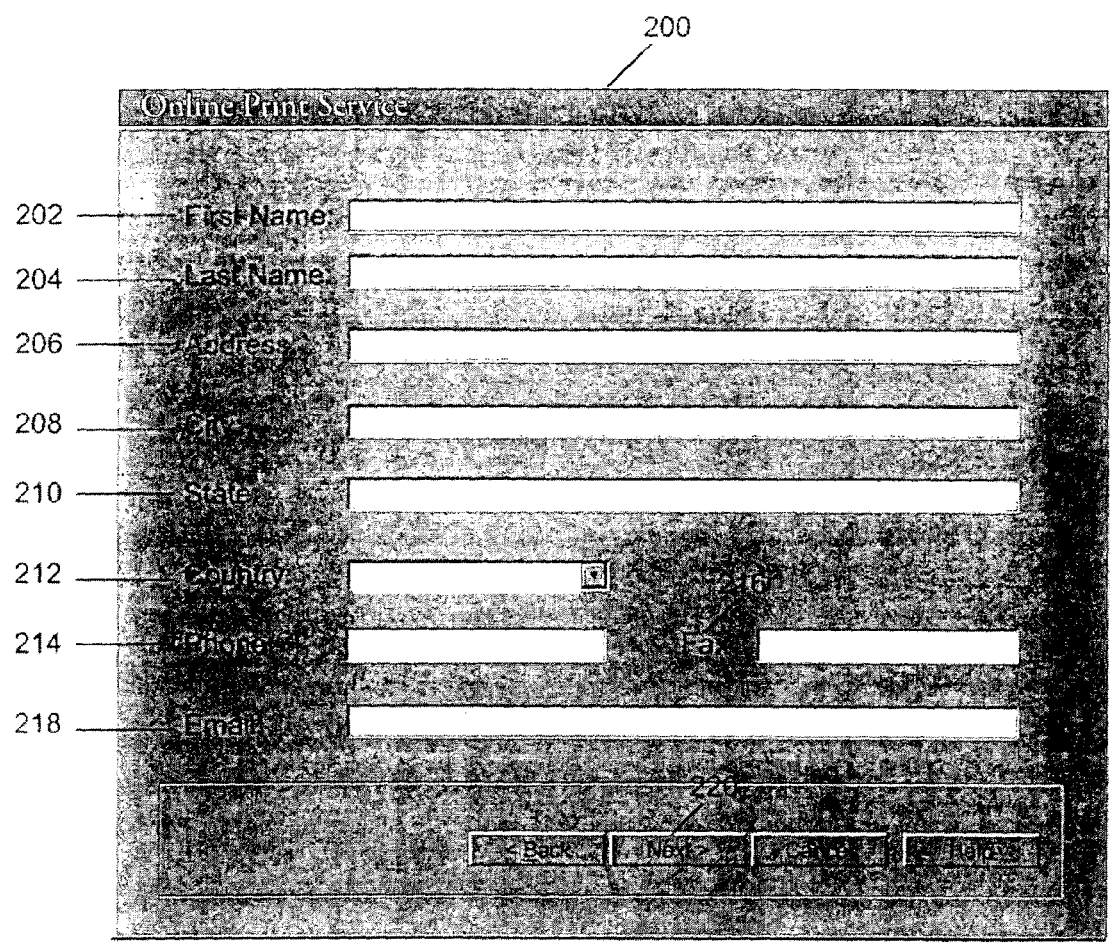
FIGS. 2A–2F show a sequence of screen shots that a user might encounter when transmitting digital images to a photo-finishing service provider.
Figure 2B:
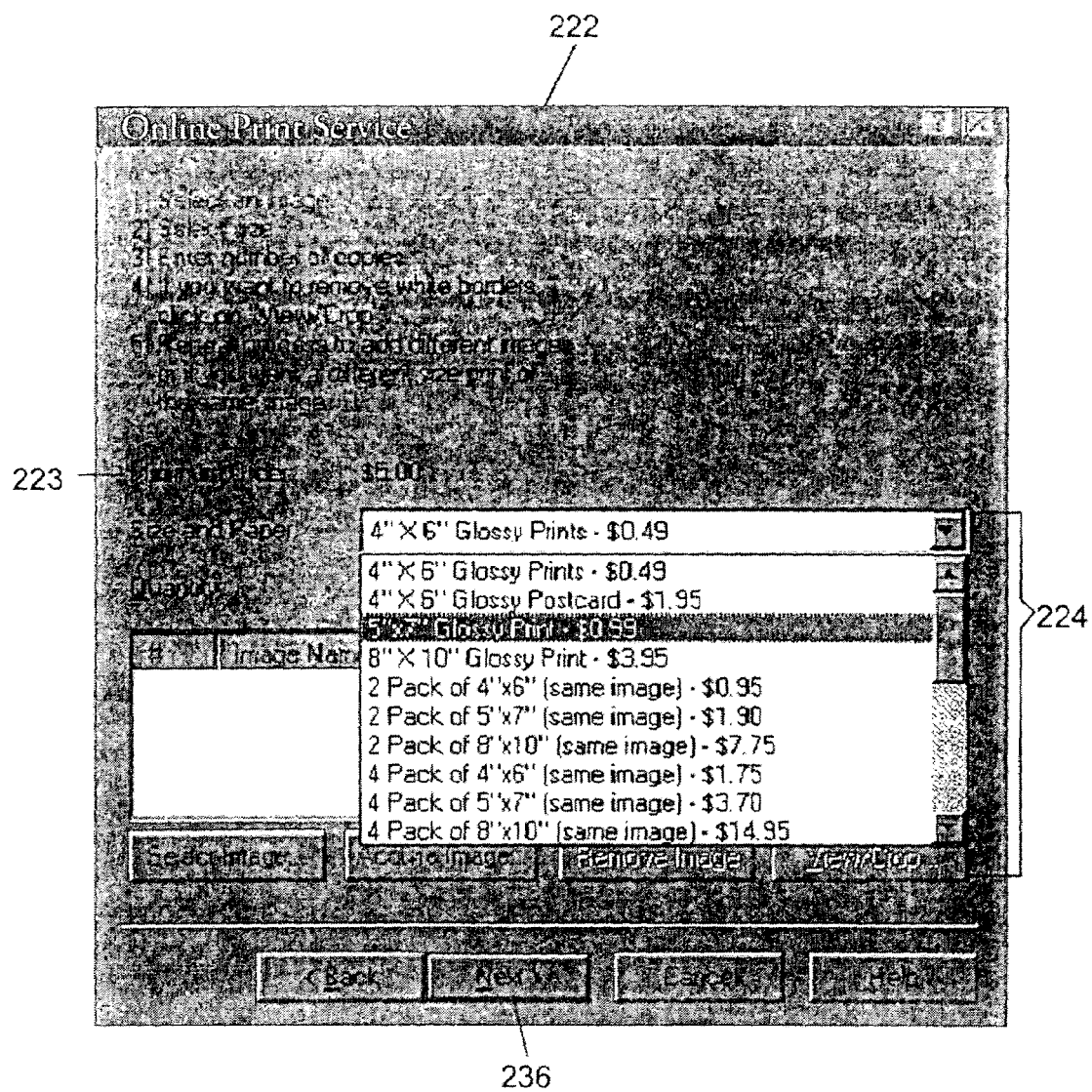
Figure 2C:
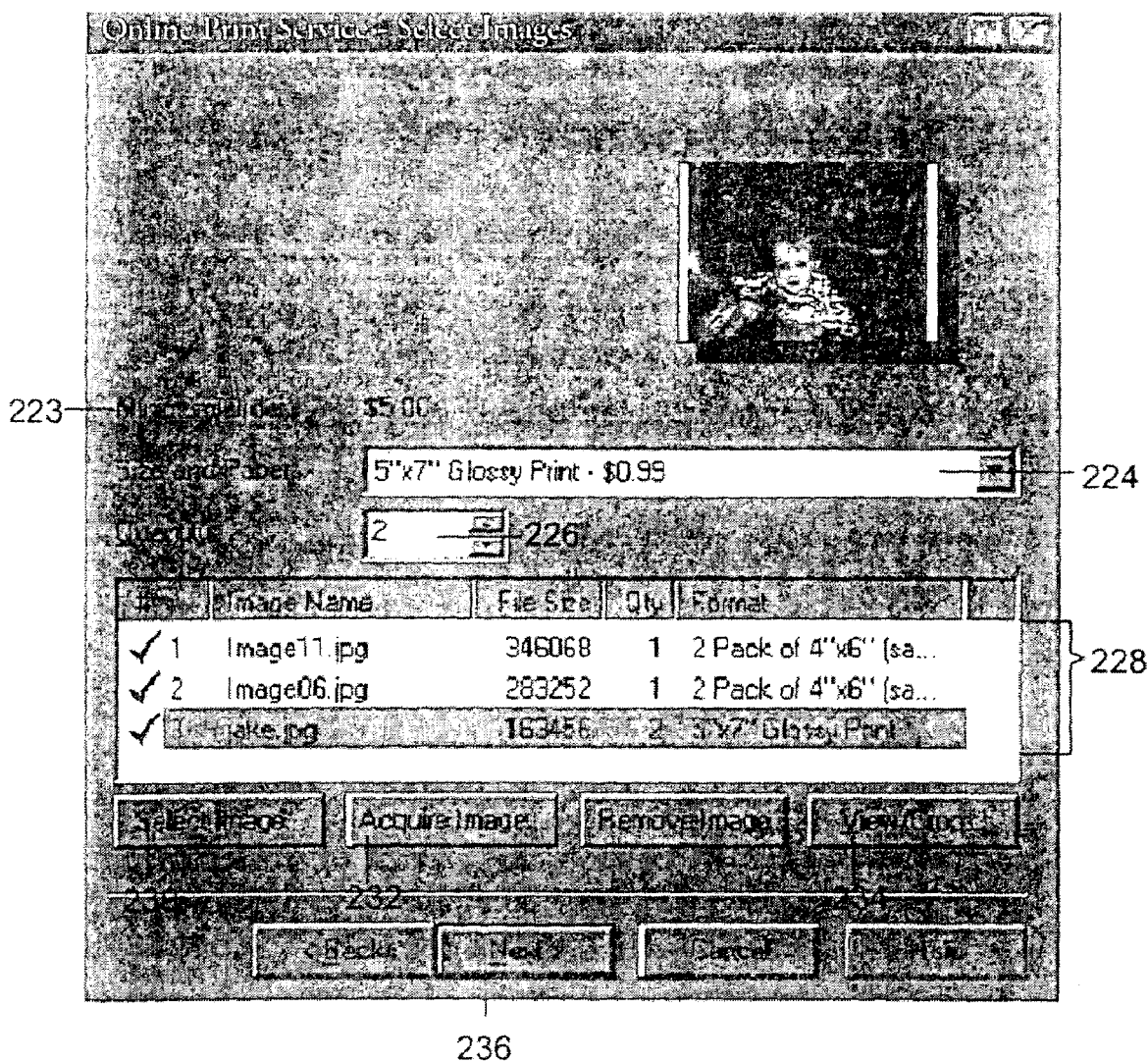
Figure 2D:
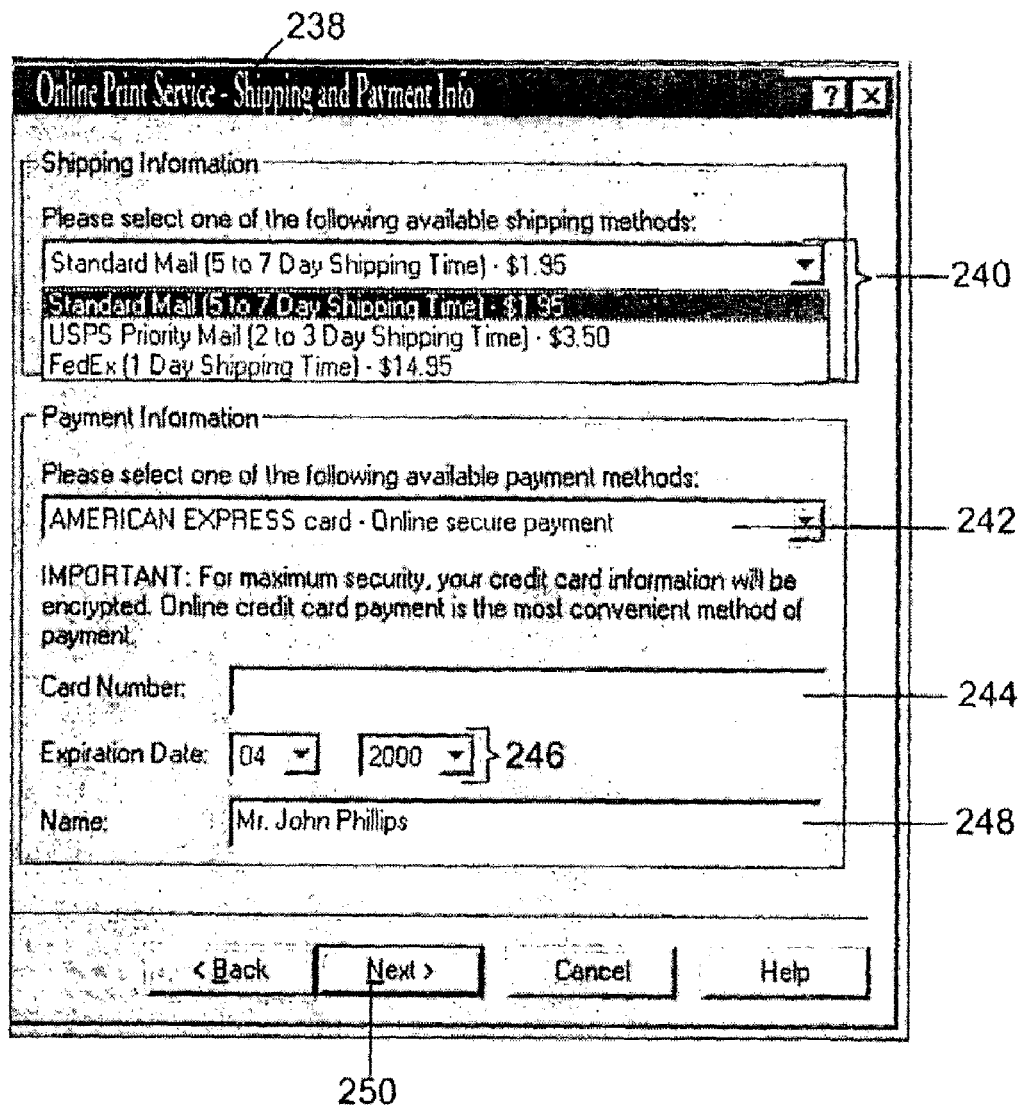
Figure 2E:
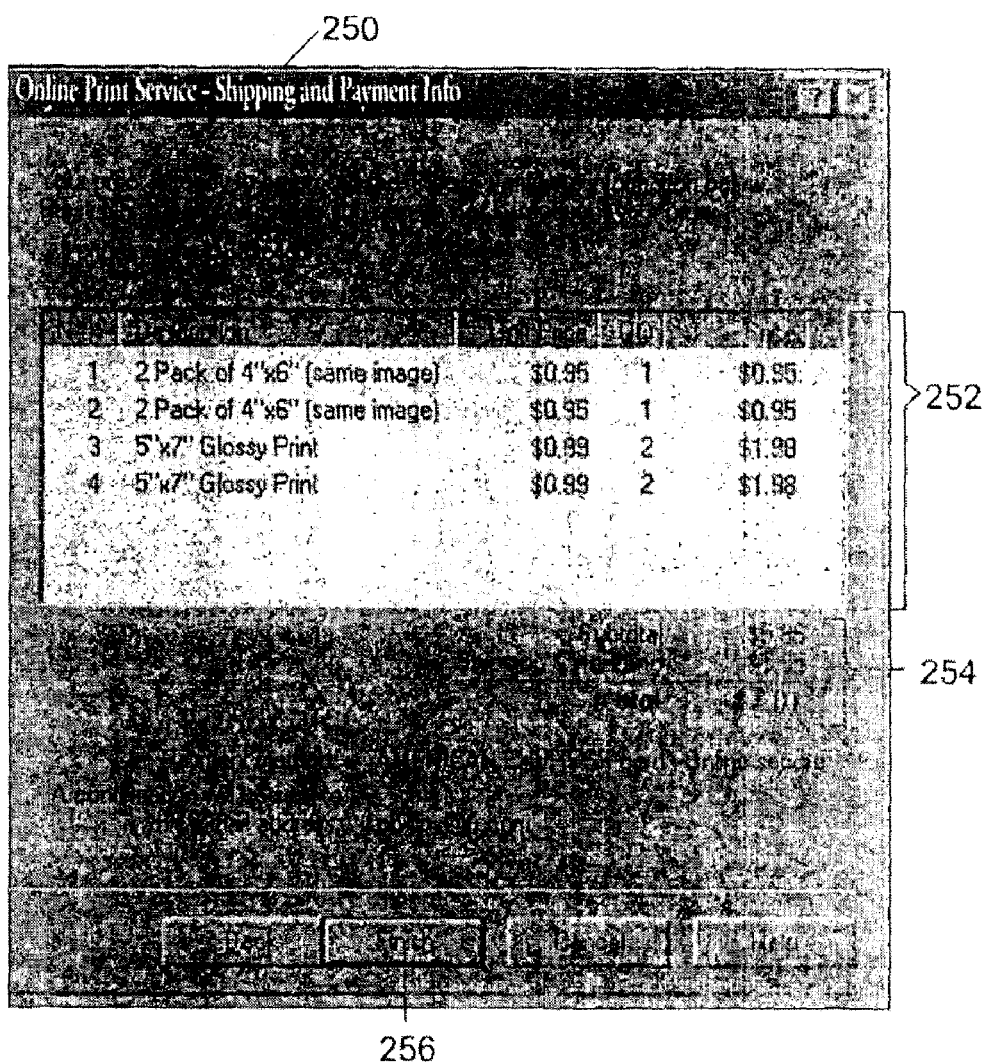
Figure 2F:
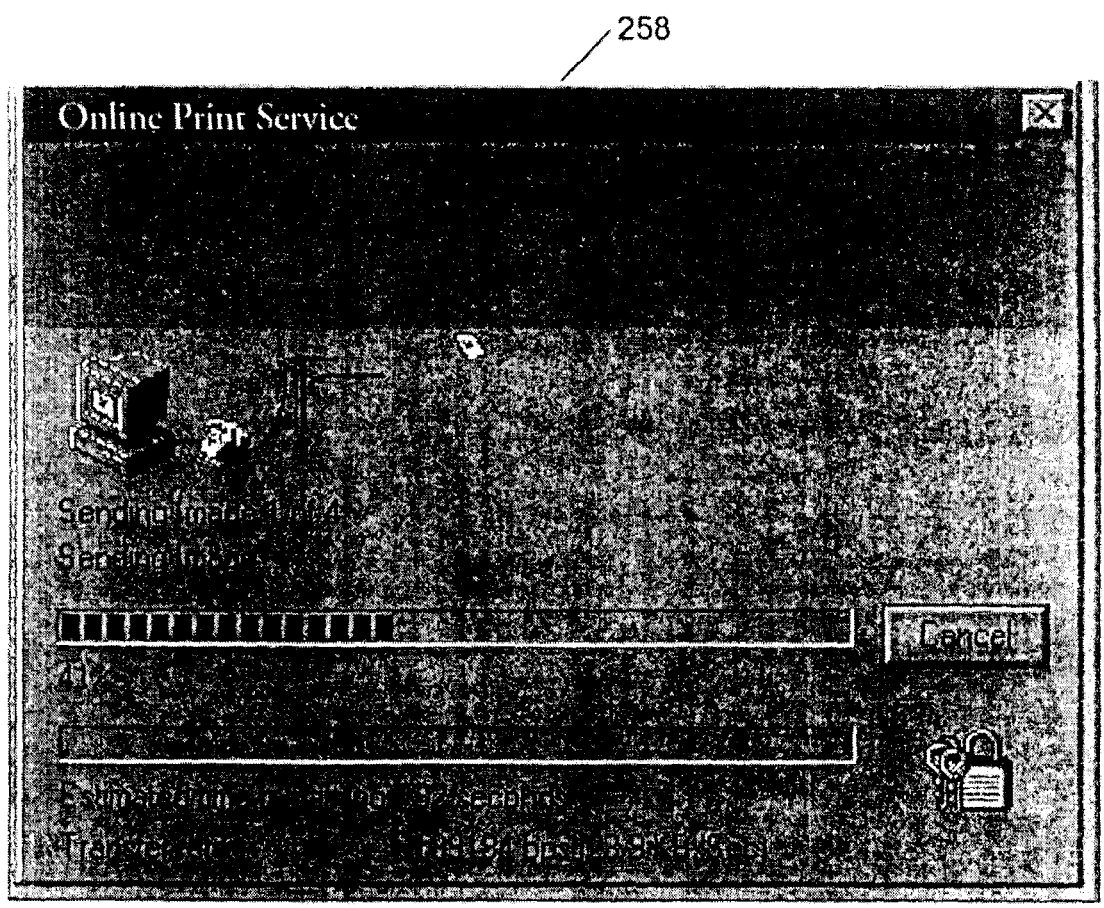
Figure 3:
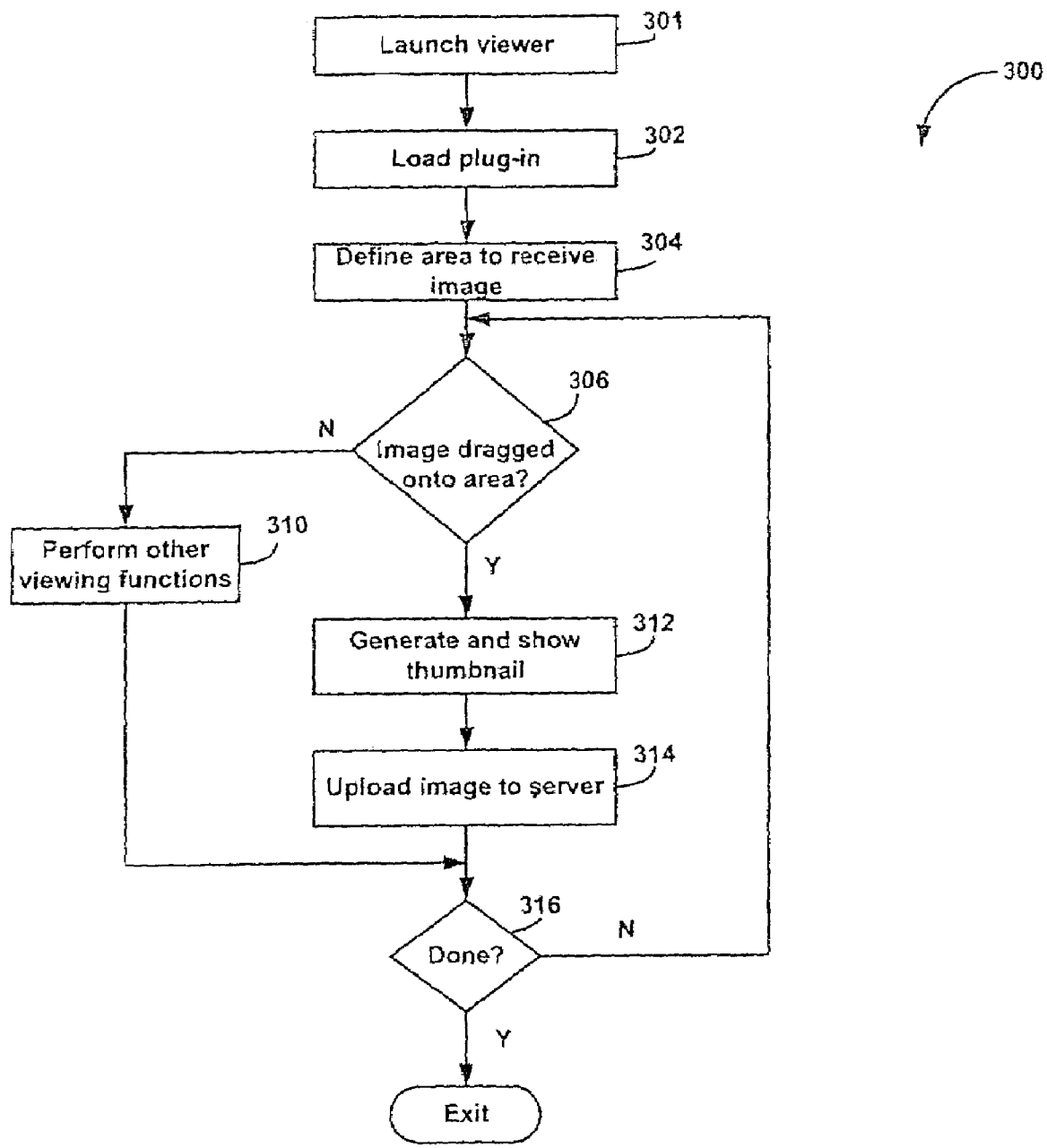
FIG. 3 show a process for generating a thumbnail associated with an image file and for uploading the image file.

Referring now to FIG. 3, a process 300 for operating on an image file is shown. First, a viewer is launched (step 301). The viewer could be a browser such as Internet Explorer, available from Microsoft Corporation of Redmond Wash., or Netscape, available from Netscape, Inc. of Mountain View, Calif. (now America Online). The browser loads a set of embedded tags such as HTML tags that instruct the browser to instantiate or load a software module such as a plug-in. The plug-in is a software program that extends the capability of the browser in a specific way—providing the ability to receive images dragged over an area defined by the plug-in. The browser does not need to run an external application in order to interpret the data, and the result can be embedded as part of the Web page. This presents the user with a single unified user interface where the Web document is a container for many different media types.

An example fragment of HTML which instantiates the Windows Internet Explorer version of the upload plugin in a web page is shown below:

```
<object id="uploaderControl" widthF0 height 0
   codebase="Uploader.cab#Version=1,0,0,1"
   classid="CLSID:B534D8C5-72CE-11D3-80A2-
      0050DA1AB5D6">
   <param name="Server" value="http://upload.shutterfly.com">
   <param name="AuthenticationID" value="000199670125">
   <param name="UploadChunkSize" value="32768">
   <param name="Mode" value="Select">
</object>
```

The software module is then loaded (step 302) to customize the viewer. The software module defines an area on the screen and registers this area with the viewer as a drag-and-drop target to receive images whenever an image is dragged into the area (step 304).

Next, the process 300 checks whether the user has dragged and dropped an image over the area defined in step 304 (step 306). This is done by periodically checking events presented by the operating system to the software module. If the events are associated with the software module, the software module executes operations associated with the events and proceeds to step 312. These operations include selecting certain images for transmission to other parties, or grouping certain images into albums, for example.

If the user has not dragged and dropped an image over the area, the process 300 allows a user to perform other viewing operations (step 310). Examples of the other viewing operations include creating and editing image files before ordering or shipping physical manifestations of one or more images. The physical manifestation of the digital content may include photographic prints of the one or more digital images, framed photographic prints, photo-album pages bearing one or more digital images, compositions of digital images and other graphical and/or textual content, and/or artifacts bearing a digital image such as a novelty item, a shirt, a coffee mug, a key-chain, a mouse pad, a magnet, or a deck of playing cards. Optionally, the set of digital content may include graphical and/or textual content, and the physical manifestation of the set of digital content may include a card (e.g., a greeting card, a holiday card, an announcement, a playing card, a post card, a thank you card, or an invitation), an advertisement, a coupon, and/or a bound volume (e.g., a photo-album or a travel book) bearing the graphical and/or textual content. The graphical and/or textual content can include digital images, digitized content, and/or computer-generated content. Other operations include ordering prints associated with all images, or alternatively dividing an order into a plurality of sub-orders so that each sub-order corresponds to a different specified recipient and includes an instance of each digital image associated with the recipient corresponding to the sub-order. The order may be specified by receiving interactive input from the viewer.

Alternatively, if the user has dragged an image onto the defined area, the process 300 generates and shows a thumbnail associated with the image (step 312) on the browser. The thumbnail is generated by the user computer. The thumbnail is shown as an additional part of the page previously loaded from the server. The combination of the newly generated thumbnail and the page is then shown by the browser.

Next, the process 300 uploads the image onto a server (step 314). From step 310 or step 314, the process 300 checks whether the user has completed operation using the viewer (step 316). If not, the process 300 loops back to step 306 to continue handling user requests. Alternatively, the process 300 exits.

In one embodiment, a browser plug-in is loaded to provide an active area on the browser where the customer can drag-and-drop images onto the active area. The plug-in is a collection of computer instructions that is detected by a computer process on the user's computer at run-time and subsequently invoked during run-time. The browser provides a mechanism through which separately provided plug-ins are detected and by which a user can invoke execution of any of the plug-ins. When the user drags-and-drops a picture into the active area, the thumbnail of the customer's picture appears on the browser. Alternatively, the customer can select images using a standard file selection dialog.

In one implementation, the plug-in is implemented as dynamically linked libraries (DLLs). A DLL is a library or a collection of computer instruction modules that can be invoked (linked) by computer instruction modules in another computer program. The invocation is performed dynamically, i.e., at run-time. The computer instruction modules of a DLL are loaded into the address space of a computer process and references to the computer instruction modules are resolved into the addresses of the loaded computer instruction modules.

Although the process of FIG. 3 is directed at uploading image files, any other file transmission operations can be performed. For instance, the user optionally can attach the image file, to an e-mail message before it is sent. In this embodiment, the user can simply drag the image icon 205 from the desktop and drop it into a message text region and the image file can then be sent. Upon receipt, recipient(s) can view and otherwise access the digital image.

Figure 4:
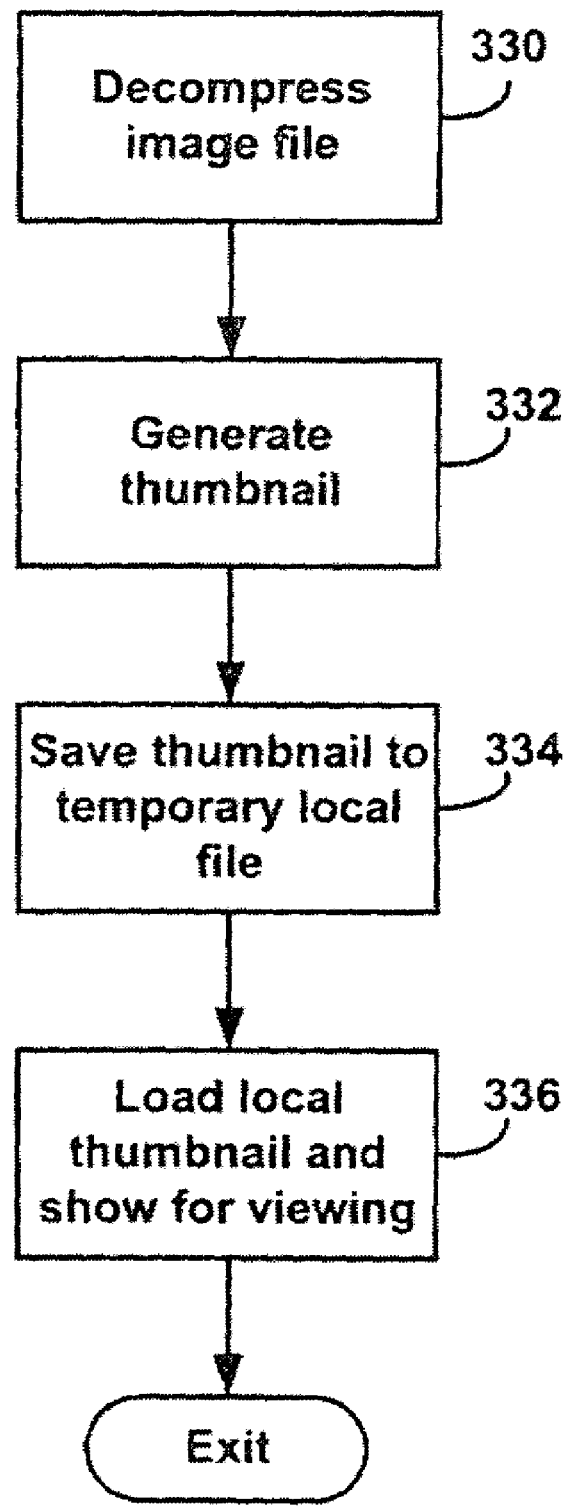
FIG. 4 shows in more detail operations associated with generating and saving the thumbnail.

Turning now to FIG. 4, step 312 is illustrated in more detail. First, the process of FIG. 4 decompresses the image file (step 330). In one embodiment, the image file can be decompressed in accordance with a standardized image compression mechanism such as JPEG (Joint Photographic Experts Group). JPEG exploits known limitations of the human eye, notably the fact that small color changes are perceived less accurately than small changes in brightness. Although the degree of lossiness can be varied by adjusting compression parameters, to preserve image quality, the image should be compressed with an appropriate quality setting (e.g., Q 75 or more). More information about the Independent JPEG Group and its library for JPEG compression and decompression is available at www.ijg.org.

During decompression, step 330 allocates and initializes a JPEG decompression object. This step then reads compressed data from the image file as well as the header of the image file to obtain image information. Parameters for decompression are then set based on the properties of the image (in particular, its colorspace). An option allows the returned image to be scaled and allow various speed/quality tradeoffs to be selected. Once the parameter values are satisfactory, the decompression process is started, which will initialize internal state, allocate working memory, and prepare for returning data. After completing a decompression cycle, the JPEG object is destroyed. Accessing the decompressed data is done by reading pixels in all scan lines.

The process of FIG. 4 then generates a thumbnail associated with the image (step 332). The thumbnail is generated by down-sampling the decompressed image file. The thumbnail is saved to a temporary local file on the user's computer (step 334). Next, the local thumbnail is shown and is made available for the user to deploy as appropriate (step 336). Particularly, the thumbnail is presented to the viewer with a path to a file associated with the thumbnail. The thumbnail is presented to the user as if the thumbnail is a part of the page served by the remote server. Thus, the user can use the thumbnail with an impression of instant access, even though the image file is not yet available from (or uploaded to) the server.

Figure 5:
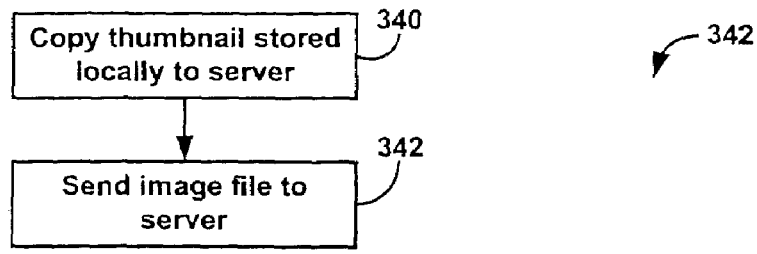
FIG. 5 is a flowchart of a process for uploading image files to a server.

Referring now to FIG. 5, step 314 of FIG. 3 is shown in more detail. First, the thumbnail is generated and stored on the user's local computer (step 340). Generation of the thumbnail includes decompressing the original file, filtering and down-sampling the image to the desired thumbnail resolution, and recompressing the thumbnail image as a JPEG file. Optionally, the process of FIG. 5 applies additional image filtering operations such as sharpening, resizing, rotating, sharpening, or color reducing operations to enhance the appearance of the thumbnail. Although JPEG is used in one embodiment, the technique is not specific to JPEG images, but rather any other method of compressing or decompressing images can be used.

When the user indicates that an image is to be uploaded (for example, by dragging and dropping the image onto a browser plug-in area), a thumbnail is first created and transmitted to the server before the entire image is uploaded. This allows the thumbnail to be displayed and used by the user while the full file is being uploaded. Thus, the user does not have to wait for the upload to finish before the user can view or access the thumbnail on the web site. The uploading of the thumbnail also allows other users to have access to the thumbnail before the full image is uploaded. This technique is also efficient in that it avoids the need to upload the full image file to the server and generating the thumbnail at the server.

When the image file is sent to the server (step 342), a script on server (web page) loads a copy of the thumbnail from client's computer. The original thumbnail stays on the client computer. The script executes an operation that loads the thumbnail stored on the customer's computer as an image on the page displayed by the browser. Images can be manipulated almost instantaneously. In addition, the process of FIG. 5 can perform a lossless compression of the file before uploading the file.

Figure 6:
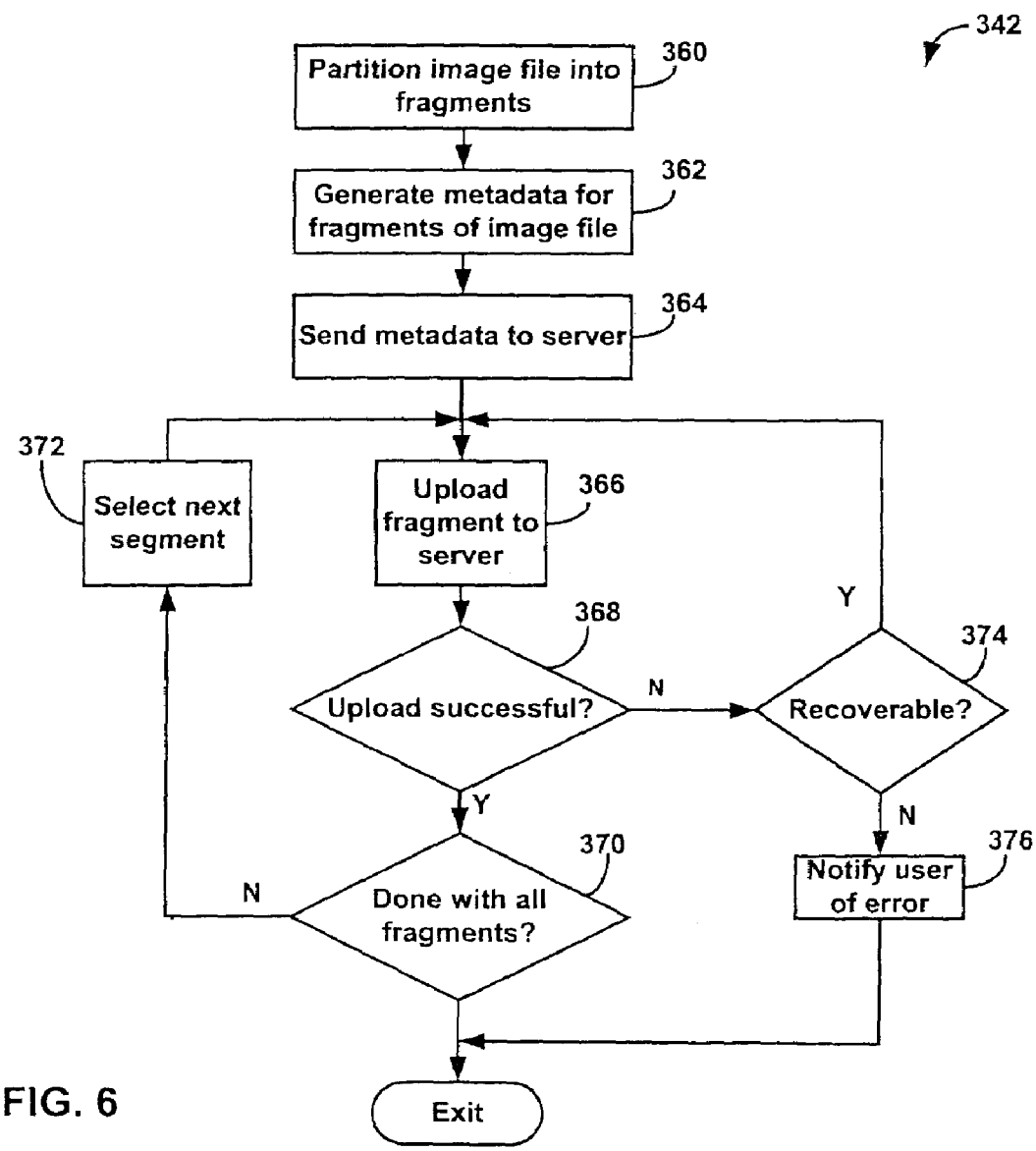
FIG. 6 is a flowchart showing in more detail the uploading of image files.

Referring now to FIG. 6, step 342 is shown in more detail. First, the image file is partitioned into one or more fragments (step 360). Next, the process of FIG. 6 generates metadata associated with the fragments of the image file (step 362). The metadata transmitted to the upload server relates not only to the individual fragments, but to the image and the image upload as a whole. In one embodiment, the data provides information on:
- raw image dimensions and file size
- preferred viewing orientation
- location of the original local file
- location of a cached copy of the original file
- size of fragments to be transmitted
- total number of fragments to be transmitted The metadata is then sent to the server (step 364). From step 364, the current fragment is uploaded to the server (step 366). Next, the process of FIG. 6 checks whether the upload was successful (step 368). If so, the process of FIG. 6 checks whether all fragments have been uploaded (step 370). If not, the next segment is selected (step 372) and the process of FIG. 6 loops back to step 366 to continue uploading the image file.

From step 368, in the event that the upload was not successful, the process of FIG. 6 checks whether the error is recoverable (step 374). If so, the process of FIG. 6 may optionally notify the user or alternatively may simply loop back to step 366 to retry the uploading of the fragment. The error is recoverable if a communication link such as an Internet link is present so that the fragment can be resend. If there is failure, the process can restart the upload after the last fragment had been successfully uploaded before occurrence of the error without re-uploading the entire image file. Thus, recovery time is minimized.

From step 374, if the error is not recoverable, the process of FIG. 6 notifies the user with an error message (step 376). The message can be sent using a variety of modalities, including email, telephone call, facsimile transmission, among others. In addition, the message can inform user on how to restart the upload. The message can also use available information about the image being uploaded to the server to provide diagnostic information in email message, including the file name, the number of fragments received and the number of outstanding fragments, the location of the file, and instructions on finishing the upload, among others. The instructions can simply instruct the user to establish the communication link and execute the browser so that the browser is activated and can continue the uploading process. From step 370 to step 376, the process of FIG. 6 exits.

The process of FIG. 6 gracefully handles upload failures in that it provides automatic recovery if possible, and if not, informs users that an upload had failed so that the user can restart the upload process. The process of FIG. 6 can handle both system related errors as well as user related errors. For instance, the user may start the upload and forget that the upload process is running due to the time required to upload multi-megabyte image files and later either turn off the computer or quit the viewer. The feedback provided by the process of FIG. 6 informs the user that he or she needs to take corrective actions rather than assume that the upload process was successful.

Figure 7:
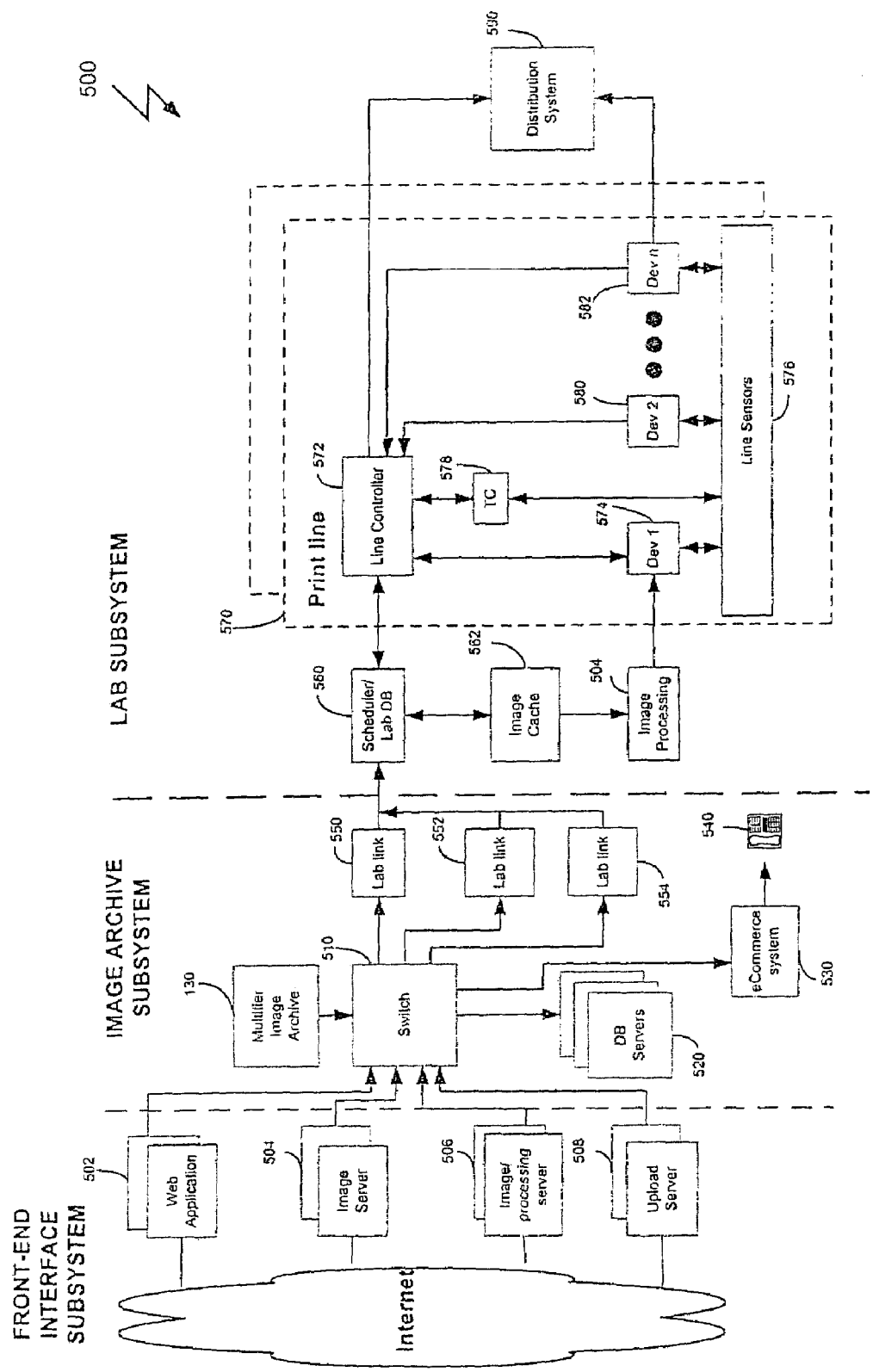
FIG. 7 is a block diagram of an embodiment of a print laboratory system.

Once the image has been uploaded, it may be shared with others, or may be printed as a photograph. FIG. 7 illustrates an embodiment that uses image data uploaded by the system of FIG. 3 in an application for handling photographic print images. The system of FIG. 7 has a front-end interface subsystem that is connected to a wide area network such as the Internet. The front end interface subsystem includes one or more web application systems 502, one or more image servers 504, one or more image processing servers 506, and one or more upload servers 508, all of which connect to a switch 510.

The switch 510 in turn routes packets received from the one or more web application systems 502, image servers 504, image processing servers 506 and upload servers 508 to the multi-tier image archive system 130.

The switch 510 also forwards communications between the web application systems 502, image servers 504, image processing servers 506 and upload servers 508 to one or more database servers 520. The switch 510 also is in communication with an e-commerce system 530 that can be connected via a telephone 540 to one or more credit card processing service providers such as VISA and MasterCard.

The switch 510 also communicates with one or more lab link systems 550, 552 and 554. These lab link systems in turn communicate with a scheduler database system 560. The scheduler database system 560 maintains one or more print images on its image cache 562. Data coming out of the image cache 562 is provided to an image processing module 564. The output of the image processing module 564 is provided to one or more film development lines 574, 580 and 582.

The scheduler database 560 also communicates with a line controller 572. The line controller 572 communicates with a quality control system 578 that checks prints being provided from the photographic film developing lines 574, 580 and 584. The quality of prints output by the film developing lines 534, 580 and 582 can be sensed by one or two more line sensors 576, which reports back to the quality controller 578. The output of the print line 570 is provided to a distribution system 590 for delivery to the users who requested that copies of the prints.

The multi-tier system uses a name resolution protocol to locate the file within the multi-tier structure. In this protocol, given an image ID, an image can be located on the multi-tier system without incurring the cost of accessing a name database. This is achieved because each image ID is unique and database lookups are not needed to resolve the desired image. This level of scalability is important since it provides the ability to scale the image retrieval bandwidth by just increasing the number of image server independent of the number of database servers. In order words, the name resolution protocol decouples the database bottleneck from the image retrieval bottleneck.

After the prints, recipients and respective parameters have been specified, the user's order is fulfilled by making prints of the designated images and distributing them to the specified recipients (step 406). In general, fulfillment can be accomplished either by the photo-finisher itself or by another entity or company in cooperation with the photo-finisher. Potentially, the photo-finisher could have business arrangements with two or more different fulfillment companies, which could be dispersed geographically (at various locations around the country or world) to minimize shipping costs, labor costs and/or delivery time. Alternatively, or in addition, different fulfillment companies could be used which have different areas of expertise or production capability. For example, one fulfillment company could specialize in making standard photographic prints, another fulfillment company could specialize in printing greeting cards, yet another fulfillment company could specialize in generating T-shirts, and so on.

Distribution and delivery of the prints to recipients could be accomplished by any of various techniques. For example, standard U.S. Mail or courier services (e.g., Federal Express or UPS) could be employed. Alternatively, the photo-finisher could have a business arrangement with various other service or delivery companies to deliver print orders along with other regularly scheduled deliveries. For example, the photo-finisher could have a business arrangement with a delivery or service company (e.g., Webvan, an online grocer in the San Francisco Bay area, or Streamline, Inc., a goods/services/convenience portal head-quartered in the Boston area) in which the prints for a particular recipient would be generated on the delivery/service company's premises and then delivered either alone or along with that recipient's order of other goods/services.

Figure 8:
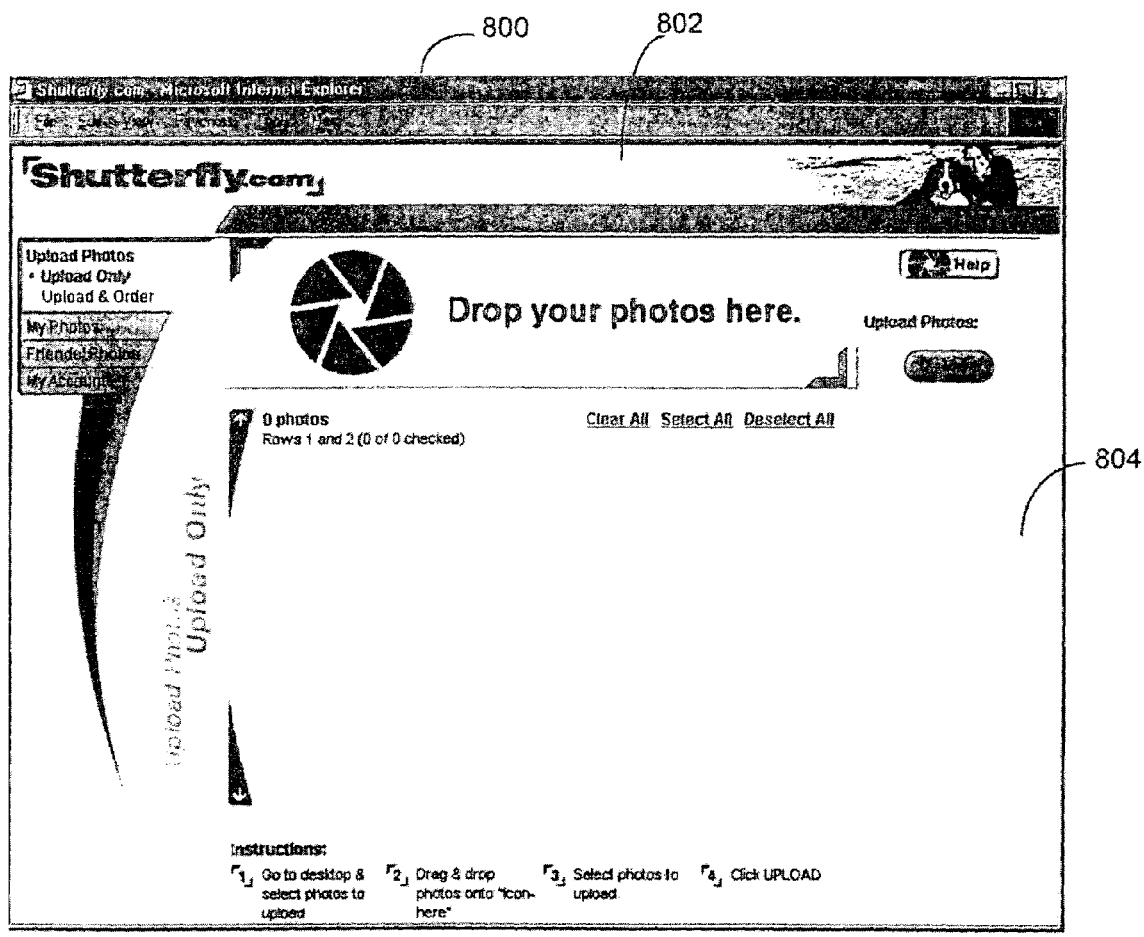
FIGS. 8–9 show two screen shots of an exemplary upload page in a web site.
Figure 9:
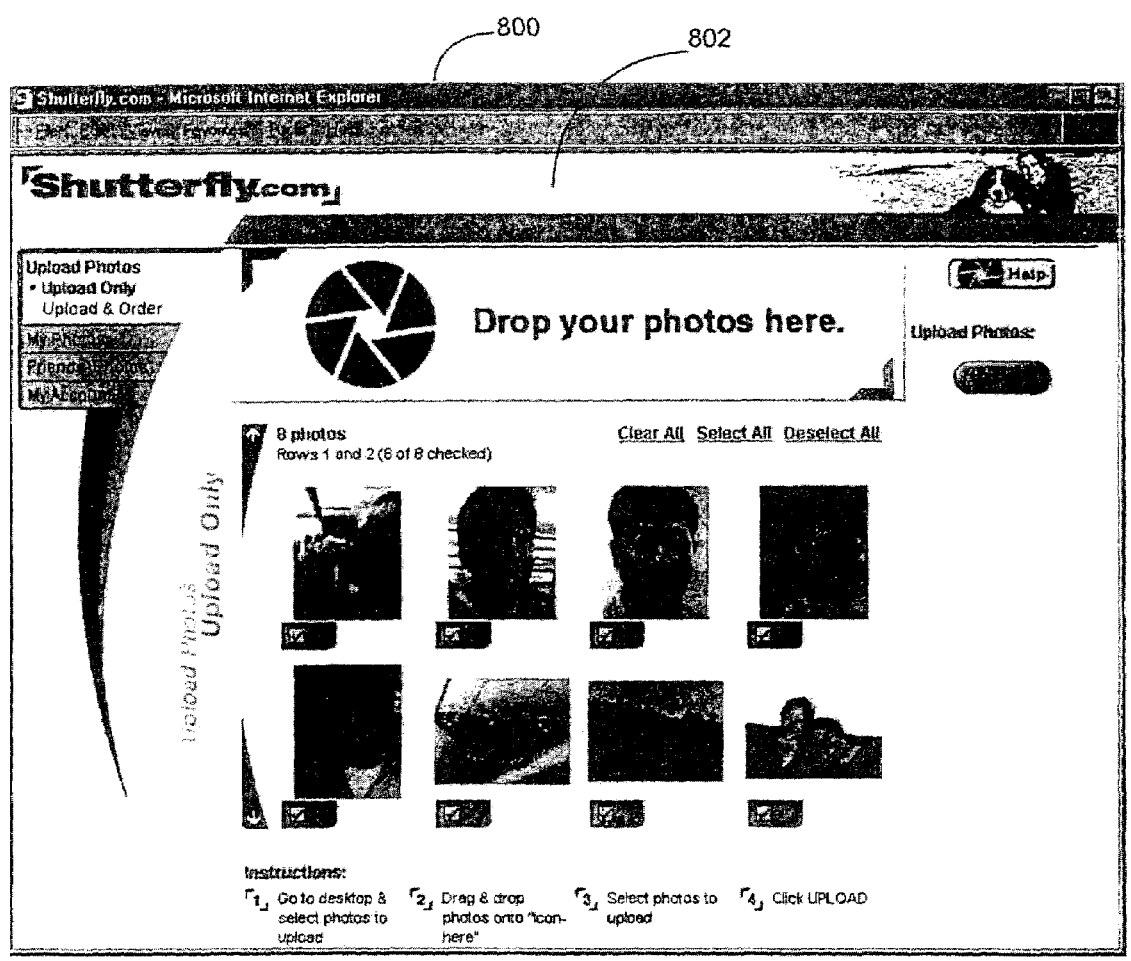

FIGS. 8–9 show two screen shots of an exemplary upload page in a web site. FIGS. 8 and 9 illustrate the system before and after dropping images onto the plugin area, respectively.

As shown in FIG. 8, a user can view a photo-finisher's web page 802, hosted on a remote server, in a browser window 800 on a client computer. The area 804 demarcated by the photo corners, which displays "Drop you photos here" is the active region for receiving an image file.

As shown in FIG. 9, after the user has dragged-and-dropped selected images into the image area 804, the plug-in causes thumbnails 805–812 to be generated locally and displayed in the image area 804 as part of the web page 802. Subsequently, the thumbnails and their corresponding images can be uploaded to the server as described above.

It is to be noted that drag-and-drop is not the only way of selecting images to upload. Other techniques for selecting images to upload include a file browser dialog selection method. Additionally, other modalities such as cut and paste can also be used to select images to upload.

The techniques, methods, and systems described here may find applicability in any computing or processing environment in which users desire to order physical manifestations (e.g., prints) of digital content and have them distributed to one or more intended recipients. For example, these techniques could be applied to allow users to choose or develop a holiday (e.g., Christmas) card design online (including images and other graphics, personalized text, personalized signatures, and/or any type of computer-generated content) and then have physical copies of that design produced (e.g., actual paper-and-ink Christmas cards) and distributed automatically to everyone on the user's Christmas card list. This same concept could be applied to enable users to design physical post cards, wedding or party invitations, thank you cards, and the like and to have them produced and distributed. In the same vein, businesses could use these techniques to design targeted mailings (sets of targeted coupons, an advertisement made up of selected text and graphic components, etc.) and have them produced and distributed to specified recipients.

The invention may be implemented in digital hardware or computer software, or a combination of both. Preferably, the invention is implemented in a computer program executing in a computer system. Such a computer system may include a processor, a data storage system, at least one input device, and an output device. Further, variations to the basic computer system are within the scope of the present invention. For example, instead of using a mouse as user input devices, a pressure-sensitive pen, digitizer or tablet may be used.

The above-described software can be implemented in a high level procedural or object-oriented programming language to operate on a dedicated or embedded system. However, the programs can be implemented in assembly or machine language, if desired. In any case, the language may be a compiled or interpreted language.

Each such computer program can be stored on a storage medium or device (e.g., CD-ROM, hard disk or magnetic diskette) that is readable by a general or special purpose programmable computer for configuring and operating the computer when the storage medium or device is read by the computer to perform the procedures described. The system also may be implemented as a computer-readable storage medium, configured with a computer program, where the storage medium so configured causes a computer to operate in a specific and predefined manner.

Other embodiments are within the scope of the following claims.

What is claimed is:

1. A method for processing an image, comprising:
defining an area to receive an image file in a user interface, dragging and dropping a symbol of the image file into the area in the user interface; and, processing the image after the image symbol is dropped into the area in the user interface, wherein the step of processing comprises at least two of image compressing, image decompressing, image resizing, image rotating, or image sharpening.

2. The method of claim 1 wherein the symbol of the image file is an image file name or an image icon.

3. The method of claim 1 wherein the symbol of the image file is a thumbnail image of the image contained in the image file.

4. The method of claim 1 wherein the user interface includes a web browser for viewing information stored at a remote computer.

5. The method of claim 4, further comprising installing a plug-in on a computer to define the area at the web browser user interface displayed by the computer.

6. The method of claim 4, further comprising sending the image file to a remote computer.

7. The method of claim 1, further comprising generating a thumbnail image associated with the processing of the image file.

8. The method of claim 1 wherein the processing of the image file includes compressing or decompressing of the image file.

9. The method of claim 1, further comprising displaying status information associated with the processing of the image file.

10. A method for processing an image, comprising:
defining an area to receive an image file in a user interface,
moving a symbol of the image file into the area in the user interface; and,
processing the image after the image symbol is moved into the area in the user interface, wherein the step of processing comprises at least two of image compressing, image decompressing, image resizing, image rotating, or image sharpening.

11. The method of claim 10 wherein moving the symbol for the image file includes
dragging the symbol for the image file across the user interface, and
dropping the symbol for the image file into the area in the user interface.

12. The method of claim 10 wherein the symbol of the image file is an image file name or an image icon.

13. The method of claim 10 wherein the symbol of the image file is a thumbnail image of the image contained in the image file.

14. The method of claim 10 wherein the user interface includes a web browser for viewing information stored at a remote computer.

15. The method of claim 14, further comprising sending the image file to a remote computer.

16. The method of claim 10, further comprising generating a thumbnail image associated with the processing of the image file.

17. The method of claim 10 wherein the processing of the image file includes compressing or decompressing of the image file.

18. The method of claim 10, further comprising displaying status information associated with the processing of the image file.

19. A computer system for processing an image, comprising:
a display to define show an area for receiving an image file in a user interface,
a user interface device for dragging a symbol of the image file and dropping the symbol for the image file into the area in the user interface; and,
a computer processor configured to process the image using at least two of image compressing, image decompressing, image resizing, image rotating, or image sharpening after the image symbol is dropped into the area in the user interface.

20. The computer system of claim 19 wherein the user interface device is a computer mouse.

* * * * *